United States Patent [19]

Bernhardt et al.

[11] Patent Number: 4,556,350
[45] Date of Patent: Dec. 3, 1985

[54] MINE ROOF ANCHOR BOLT

[76] Inventors: Frederick W. Bernhardt; John E. Schott, both of C/- Chemfix Pty. Limited, 102 Albatross Rd., Nowra, New South Wales, Australia, 2540

[21] Appl. No.: 376,172

[22] Filed: May 7, 1982

[51] Int. Cl.⁴ .................... F16B 31/02; E21D 20/02
[52] U.S. Cl. .................................... 411/10; 411/3; 411/429; 411/397; 411/82; 405/260
[58] Field of Search ........................ 411/1–5, 411/10, 11, 15, 429–431, 302–304, 908, 82, 295, 377, 397, 427; 405/259–261

[56] References Cited

U.S. PATENT DOCUMENTS

| | | | |
|---|---|---|---|
| 2,826,222 | 3/1958 | Case | 411/908 |
| 4,295,761 | 10/1981 | Hansen | 411/1 |
| 4,347,020 | 8/1982 | White et al. | 411/5 |
| 4,349,299 | 10/1982 | Eny | 405/261 |
| 4,386,877 | 6/1983 | McDowell, Jr. | 405/261 |

Primary Examiner—Alexander Grosz
Assistant Examiner—Neill Wilson
Attorney, Agent, or Firm—Roberts & Floyd

[57] ABSTRACT

This specification describes a new anchor or rock nut which is used in association with an anchor bolt to rupture packages of two or more component setting mixtures. The nut is characterized by having a plug of thermosetting resinous material formed in situ which plug may be removed by the anchor bolt when screwed into the nut under the application of a pre-determined force which cause the plug to crumble; however until the predetermined force is reached the nut will cause the bolt to rotate.

1 Claim, 1 Drawing Figure

MINE ROOF ANCHOR BOLT

FIELD OF THE INVENTION

This invention relates to improvements in anchor or rock nuts and bolts, systems for fixing same in mine roofs or walls and to the method of manufacturing the nuts. The system can also be applied for fixing studs or the like in position in, for example, civil or mechanical engineering works, however, for the sake of convenience, the description will relate to rock nuts and bolts; but nevertheless, its broader applicability will be immediately apparent to those skilled in the relevant art.

DESCRIPTION OF THE PRIOR ART

Rock bolts comprise two main groups—those fixed in position by mechanically expanding end portions and those fixed chemically, wherein the bolt ruptures packages of two (or more) component setting mixtures of grout or adhesive composition.

One example of a prior art system is the strengthening of the roof of an underground passage such as an adit, drift, or gallery of a mine: bores are drilled from below the roof and stuffed with frangible packages or cartridges of interreacting components of a bonding agent which are subsequently pierced by the rock bolt tips as the bolts are driven into the bores. Each bolt terminates at its lower end in screw threads engaged by a nut which supports a washer.

In the past, various ways have been used to torque the bolt correctly, to apply the required pre-compression to the rock strata. In one way, the threads on the bolt included a discontinuity, preventing the detachment of the nut. During emplacement of each bolt, the nut is gripped by a wrench which (for roof emplacement) is turned under upward pressure first in a reverse or unscrewing direction, causing the nut to engage the discontinuity and to entrain the inserted bolt to pierce the packages and thence to stir the contents thereof together until the bonding material begins to set; then the nut is turned in a forward or screw-tighten direction until the washer comes to rest against the roof surface under a pressure which tensions the sealed-in bolt against the roof strata. A variation of this involves the use of a metal disc punched into the last or lowermost (for roof application) thread of the nut for more or less the same purpose. That is, the nut can be screwed onto the bolt as far as the disc, whereby the bolt will then rotate with the nut as before, to fracture the packages of bonding material, when the bolt is set, further screwing on of the nut punches out the disc and the bolt can then be tensioned as required. A second way involves the use of "crimping" whereby, either the nut or bolt thread is slightly deformed to cause sufficient resistance that the nut and bolt rotate together until the bolt sets in position. The nut can then be screwed home to tension the bolt.

Thus in Australian Pat. No. 487898 there is described a method of installing an anchor bolt assembly comprising the steps of:

(a) forming a hole in a mine roof,
(b) placing a container in the hole, the container having therein a settable resin,
(c) locating at least a part of an elongate member in the hole, the elongate member having an external threaded portion at at least an end thereof remote from said part and the threaded portion having a nut located thereof and including means releasably holding said nut and said elongate member with respect to each other and thereby permitting rotation of the nut and elongate member substantially as a unitary member in a given rotational direction until a predetermined resistance force between the nut and bolt is exceeded,
(d) driving the nut to cause rupture of the container by the elongate member and thereby releasing the resin,
(e) rotating the elongate member by applying to the nut a rotational force below said predetermined resistance force to mix the resin,
(f) allowing the resin to set and secure the elongate member, and
(g) applying an increased rotational force to the nut, which increased force is sufficient to overcome said predetermined resistance force, and thereby permitting rotation of the nut with respect to the elongate member in said given rotational direction.

The problem with these prior art methods is that their manufacture is somewhat less than simple, and in operation, they are capable of generating heat or sparks, which is undesirable for coal mines in particular, and thread damage to the bolt.

In the provisional specification (filed Mar. 5, 1980) of copending Australian application No. 68116/61 there is described a method for rotating an elongated threaded member and subsequently running a nut along the elongate threaded member comprising the steps of threading onto an end of the elongate threaded member an internally threaded nut, which is formed within its internally threaded bore with a displaceable insert which is capable of being driven out of the bore of the nut, until the said end of the elongate threaded member engages the insert, causing the elongate threaded member to rotate by applying a rotational force to the nut until the torque required to drive the elongate threaded member exceeds the force required to displace the insert from within the nut, rotating the nut relative to the elongate threaded member to eject the insert from the bore of the nut and then further rotating the nut relative to the elongate threaded members to cause the nut to be run along the elongate threaded member.

In a further aspect of that application there is described a nut having formed within its internally threaded bore a displaceable insert which is capable of being driven out of the bore by a threaded member, which has been screwed into the bore of the nut until it contacts the insert, upon the application of a torque between the nut and the member which is greater than that required to cause relative movement between the nut and the member after the insert has been driven from the bore of the nut.

In another embodiment of that application there is described a method for the production of a nut comprising positioning a nut over an anvil which extends part way through the bore of the nut, inserting an insert having a peripheral shape which fits within the bore of the nut into the bore, inserting into the bore a die adapted to cooperate with the anvil to deform the insert such that its peripheral edge engages with the side wall of the bore of the nut and retains the insert in position in the bore. The insert preferably comprises a disc of a metal or a synthetic plastics material which is preferably domed prior to being inserted into the bore of the nut. Flattening of the domed insert between a die and an anvil will cause the insert to firmly engage the threaded surface of the bore around its complete periphery. The advantage of the arrangement is that once the insert has been removed from the nut the nut will be free to be run up the bolt under a relatively low applied torque. This enables the nut to be adequately tightened, and the bolt to which it is attached properly tensioned, without the torque applied to the nut being used principally to overcome a frictional resistance between the nut and the bolt.

SUMMARY OF THE INVENTION

This invention provides a nut which possesses all the advantages of nuts previously referred to and additionally insures consistent and pre-determinable results in practice.

Thus in one broad aspect this invention provides a nut having a resin or plastics plug formed in situ and thereby chemically bonded to the threads of the nut in contact with the resin.

In another aspect this invention provides a method for rotating an elongate threaded member and subsequently running a nut along the elongate threaded member comprising the steps of threading onto an end of the elongate threaded member a nut of this invention, until the said end of the elongate threaded member engages the plug, causing the elongate threaded member to rotate by applying a rotational force to the nut until the torque required to drive the elongate threaded member exceeds the torque required to cause the plug to crumble from within the nut, rotating the nut relative to the elongate threaded member to remove the plug from the bore of the nut and then further rotating the nut relative to the elongate threaded member to cause the nut to be run along the elongate threaded member, displacing the resin left in the threads after rupture of the main body of the plug.

DETAILED DESCRIPTION

Figure 1:
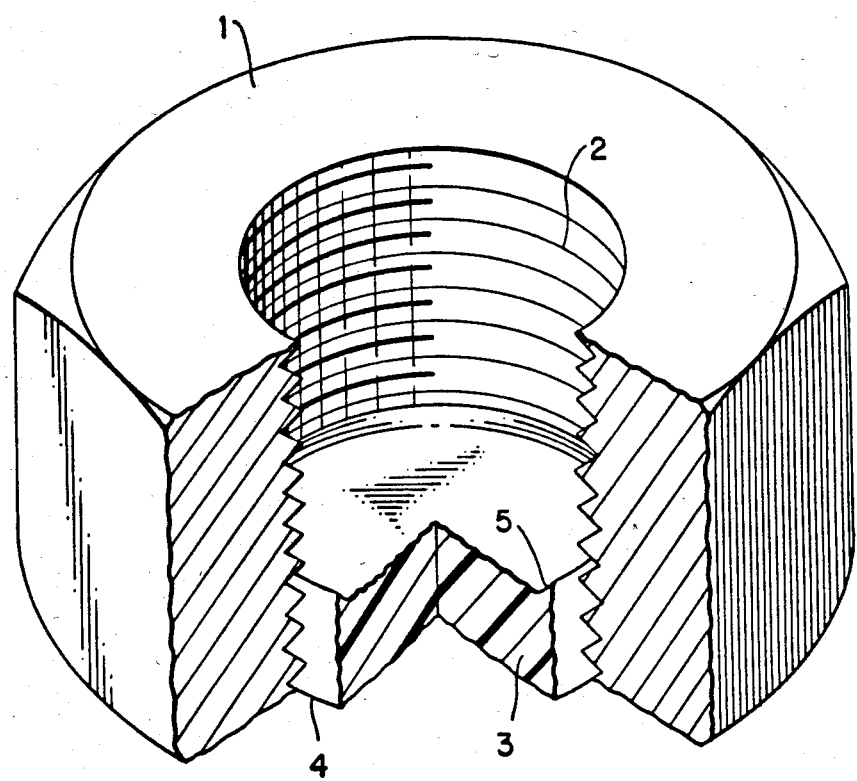
FIG. 1 shows a preferred embodiment of a nut of the invention in cut-away section.

Now having regard to the drawing 1 represents a nut proper, 2 the threads, 3 a resin plug, 4 the base or bottom surface of the plug which is, in practice, substantially coplanar with the base of the nut 1 and 5 the top surface of the plug.

One way of preparing the nut of the invention is to take a standard nut and using some form of settable bonding material (e.g. two or multi component epoxy or unsaturated polyester or polyurethane systems) form in situ a member of fixed depth (depth being a factor in determining the rupture torque) inside the nut, and allowing it to cure. The depth sets the area of the bond which thus is a major factor in determining the rupture torque. The strength of the cast-in resin is also a factor in determining the rupture torque. In use, the nut and bolt rotate together until the packages of bonding material are fractured and the bolt is set in the hole. When further torque is applied to reach the predetermined rupturing torque of the resin member; the latter breaks up, without sparking or causing thread damage, and the nut can be screwed home to tension the bolt.

Degreasing the nuts prior to treatment is desirable as it ensures bonding of the plug to each nut, thereby providing consistency of performance in the field.

As far as the mechanically fixed types of rock bolts are concerned, these involve some kind of expanding arrangement at the end of the bolt in the hole (e.g. expansion shell, split end and wedge). Many of these types of bolt operate in the same way as the chemically fixed bolt, thus initial rotation thereof operates and locks the expansion mechanism to thus fix the bolt. Therefore the present invention is applicable to this type of bolt. Thus the nut and bolt together rotate until the bolt is fixed, and further rotation of the nut breaks the chemical bonded resin member, whereafter the nut can be screwed home to tension the bolt.

As previously stated, the invention also applies to studs for civil and mechanical engineering works—example the setting of anchor bolts into concrete and masonry, and the above broadly described invention is to be equally broadly construed in its construction and applicability.

Useful suitable formulations for nut plugs or inserts are described in the following examples:

EXAMPLE (1)

Liquid epoxy (epoxide equivalent 190–210) one hundred parts by weight. Polyamide (amine number 380–420) fifty parts by weight. Curing agent known in the trade as K54 (tris-2,4,6-dimethylaminomethyl phenol) two parts by weight and obtainable from Anchor Chemicals Pty. Ltd.

EXAMPLE (2)

Liquid epoxy (epoxide equivalent 190–210) one hundred parts by weight. "Thiokol" polysulphide liquid polymer LP-3 fifty parts by weight. Curing agent known in the trade as K54 (tris-2,4,6-dimethylaminomethyl phenol) fifteen parts by weight. Thiokol is a registered trade mark.

EXAMPLE (3)

Flexible unsaturated polyester resin such as Monsanto Crystic 498 one hundred parts by weight and containing 1% promoter diethyl aniline, mineral filler such as calcite and/or talc, silica etc., two hundred to two hundred and fifty parts by weight and two percent powdered benzoyl peroxide or its equivalent in paste form.

In the above examples, degreasing of the nut may be achieved efficiently by suspending each nut in the vapour phase above a boiling solvent such as trichloroethylene, perchloroethylene or the like.

The preferred resin plug for a nut of 24 mm internal diameter, covers about three of the outermost threads at one end—this is a depth of about 8 mm and requires about 4 ml of resin mix. When forming the resin plug, the nuts are desirably placed on a tray treated with a release agent and the desired amount of resin poured in and allowed to cure.

Suitable release agents include polyethylene, various waxes, silicone and polyvinyl alcohol.

A nut of the invention having an internal diameter of 24 mm and a plug 4 ml of anyone of the formulations described in the examples requires a torque of the order of 110–160 mm to cause the in situ plug to crumble. If a higher or lower predetermined torque is desired a greater or lesser amount of resin mix will need to be used or alternatively, a modified formulation with suitable physical characteristics, or both.

A further aspect of the present invention is that due to the manner in which the plug is formed in situ, its surface will have a meniscus which substantially matches the domed end of the rock bolt, whereby tightening of the rock bolt exerts an even pressure on the surface of the plug.

We claim:

1. In a mine roof anchor bolt assembly the improvement comprising:
   (a) a nut for threaded attachment to the end of the bolt protruding from the mine roof,
   (b) a bore of uniform diameter running from top to bottom of said nut along the central axis of said nut,
   (c) said bore having internal threads from the top to the bottom of said bore,
   (d) a resin plug at the bottom of the bore,
   (e) said resin plug chemically bonded to the bore of the nut, whereby the bolt is initially rotated by the nut and the plug until a pre-determined rotational torque is achieved and then the nut is rotated relative to and is advanced axially along the bolt when the chemical bond of the resin plug is broken, to tighten the nut on the roof of the mine.

* * * * *